United States Patent
Ganeshmani et al.

(10) Patent No.: US 11,086,606 B2
(45) Date of Patent: *Aug. 10, 2021

(54) SYSTEM AND METHOD FOR DYNAMIC PROCESS FLOW CONTROL BASED ON REAL-TIME EVENTS

(71) Applicant: Capital One Services, LLC, McLean, VA (US)

(72) Inventors: Jayaraman Ganeshmani, Plano, TX (US); Kissoon John Ramotar, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/716,751

(22) Filed: Dec. 17, 2019

(65) Prior Publication Data

US 2020/0356348 A1  Nov. 12, 2020

Related U.S. Application Data

(63) Continuation of application No. 16/405,135, filed on May 7, 2019.

(51) Int. Cl.
*G06F 9/45* (2006.01)
*G06F 8/41* (2018.01)
(Continued)

(52) U.S. Cl.
CPC .............. *G06F 8/443* (2013.01); *G06F 8/30* (2013.01); *G06F 8/65* (2013.01); *G06F 9/451* (2018.02);
(Continued)

(58) Field of Classification Search
CPC ...................................................... G06F 8/443
(Continued)

(56) References Cited

U.S. PATENT DOCUMENTS 7,992,128 B2 * 8/2011 Hammerich ........ G06F 9/44505
717/106
8,046,751 B1 * 10/2011 Avadhanula .............. G06F 8/75
717/156
(Continued)

FOREIGN PATENT DOCUMENTS

WO   WO-2013072232 A1 *  5/2013  .......... H04L 41/142
WO   WO-2020096639 A1 *  5/2020  .......... G06F 9/5061

OTHER PUBLICATIONS

Zheng Wang et al.; "Partitioning Streaming Parallelism for Multi-cores: A Machine Learning Based Approach"—Institute for Computing Systems Architecture School of Informatics The University of Edinburgh, UK. PACT'10, Sep. 11-15, 2010, Vienna, Austria.*

*Primary Examiner* — Francisco J Aponte
(74) *Attorney, Agent, or Firm* — Kacvinsky Daisak Bluni PLLC (57) ABSTRACT

An exemplary process management server disclosed herein comprises a machine-learning model that may be trained to expose processes from a message stream in response to a training table. In one embodiment, one or more performance metrics of the exposed processes may be monitored to identify a process anomaly or other change in process performance, and to dynamically modify one or more process components in response thereto. Such an arrangement improves system performance, efficiency and resource utilization. For example, system performance may be improved by re-ordering process steps to minimize resource overlap. Efficiency and resource utilization may be improved by re-ordering process steps to maximize parallel processing and reduce lag times and bottlenecks.

20 Claims, 6 Drawing Sheets

(51) Int. Cl.
  *G06F 8/30* (2018.01)
  *G06F 8/65* (2018.01)
  *G06Q 10/06* (2012.01)
  *G06N 20/00* (2019.01)
  *G06F 9/451* (2018.01)

(52) U.S. Cl.
  CPC ....... G06N 20/00 (2019.01); G06Q 10/06313 (2013.01)

(58) Field of Classification Search
  USPC .......................................................... 717/159
  See application file for complete search history.

(56) References Cited

U.S. PATENT DOCUMENTS

| | | | | |
|---|---|---|---|---|
| 8,418,158 | B1* | 4/2013 | Koh | G06F 8/443 |
| | | | | 717/151 |
| 8,826,255 | B1* | 9/2014 | Avadhanula | G06F 8/433 |
| | | | | 717/156 |
| 8,898,634 | B2* | 11/2014 | Weatherhead | G06F 8/71 |
| | | | | 717/120 |
| 9,135,143 | B2* | 9/2015 | Correll | G06F 11/362 |
| 9,280,322 | B2* | 3/2016 | Reyes Lozano | G06F 8/77 |
| 9,286,032 | B2* | 3/2016 | Feblowitz | G06F 8/36 |
| 9,569,179 | B1* | 2/2017 | Kachmar | G06F 8/34 |
| 10,291,493 | B1* | 5/2019 | Rustad | H04L 43/04 |
| 10,333,820 | B1* | 6/2019 | Wang | H04L 41/12 |
| 10,387,989 | B2* | 8/2019 | Meixner | G06F 8/447 |
| 10,481,879 | B2* | 11/2019 | Stevens | G06F 8/35 |
| 10,579,494 | B2* | 3/2020 | Schmidt | G06F 11/3006 |
| 2003/0233640 | A1* | 12/2003 | Reynaud | G06F 8/452 |
| | | | | 717/154 |
| 2009/0249281 | A1* | 10/2009 | Fritzsche | G06F 11/3447 |
| | | | | 717/104 |
| 2012/0124363 | A1* | 5/2012 | Dietrich | G06F 11/3466 |
| | | | | 713/100 |
| 2018/0239593 | A1* | 8/2018 | Miyamoto | G06F 8/30 |
| 2018/0349772 | A1* | 12/2018 | Tokui | G06N 3/105 |
| 2019/0012156 | A1* | 1/2019 | Daly | G06F 30/30 |
| 2019/0012434 | A1* | 1/2019 | Frazier | G16H 10/20 |
| 2019/0129732 | A1* | 5/2019 | Sivertson | G06F 8/433 |
| 2019/0205745 | A1* | 7/2019 | Sridharan | G06F 9/5077 |
| 2020/0186808 | A1* | 6/2020 | Joshi | H04N 19/176 |

* cited by examiner

SYSTEM AND METHOD FOR DYNAMIC PROCESS FLOW CONTROL BASED ON REAL-TIME EVENTS

RELATED APPLICATION

This application is a continuation of U.S. patent application Ser. No. 16/405,135, titled "SYSTEM AND METHOD FOR DYNAMIC PROCESS FLOW CONTROL BASED ON REAL-TIME EVENTS" filed on May 7, 2019. The contents of the aforementioned application are incorporated herein by reference.

BACKGROUND

Service providers provide, such as telecommunications service providers (TSPs), application service providers (ASPs), storage service providers (SSPs), and internet service providers (ISPs) may provide internal or outsourced service support to an enterprise. One factor by which a service provider is judged is the speed of delivery of the associated service. Services may comprise one or more processes, each process comprising one or more sub-processes. Where possible, parallel handling of processes can improve service performance. However, inter-process dependencies may limit the opportunity for parallel handling for example when one process or subprocess cannot begin without obtaining information generated from another process or subprocess.

In addition to inter-process dependencies, service performance may also be impaired in response to resource loading. For example, processes and sub-processes seeking access to processing and memory resources at the same time may cause delays in process/subprocess execution. One way of overcoming such resource conflicts is to scale resources up and down in accordance with processing demands. While such a solution is one way to achieve capacity, it may increase enterprise costs, and bottlenecks and delays may result as resources are scaled into and out of the system.

SUMMARY

According to one aspect, a process management server includes a computer memory, a processing unit coupled to the computer memory and a training table, stored in the computer memory and including a process instance associated with a process of an application service. The process management server also includes a process map configured to store, for the process instance, at least one expected performance metric for the process. The process management server may also include an interface for receiving a message stream, a machine-learning model coupled to the interface and trained by the training table to locate the process in the message stream and to calculate a detected performance metric for the process and an analyzer configured to compare the expected performance metric to the detected performance metric to detect an anomaly. The process management server may also include, in some embodiments, a code generator, coupled to the analyzer and configured to generate and deploy updated program code for the process to remediate the anomaly.

According to another aspect, method for managing processes in a service provider enterprise includes the steps of identifying a process comprising an application service storing a process instance in a training table, including generating a process map storing at least one expected metric for the process, receiving a message stream. The method includes processing the message stream using a machine-learning model trained by the training table to locate the process including collecting determined performance metrics for the process, comparing the expected performance metrics to the determined performance metrics to detect an anomaly, and modifying program code associated with the process to remediate the anomaly.

According to a further aspect, a process management server comprising includes a computer memory for storing a stored message stream associated with an application service and a training unit for iteratively applying the stored message stream to a first machine learning model to generate a training table for storage in the computer memory, the training table configured to identify a plurality of processes of the application service. The server may include a process map configured to store, for each of the plurality of processes, at least one expected performance metric. The server may further include an interface for receiving a message stream and a second machine-learning model coupled to the interface and trained by the training table to locate the plurality of processes in the message stream and to calculate a detected performance metric for each of the plurality of processes. The server may also include an analyzer configured to compare the expected performance metric to the detected performance metric for each of the plurality of processes to detect one or more anomalies and a user interface comprising a display and a visualization unit configured to hierarchically display information related to a combination of one or more of the expected performance metric and the detected performance metric for each of the plurality of process instances to a user and to accept input from the user to control the plurality of processes of the application service.

With such an arrangement, process and subprocess inter-dependencies and resource bottlenecks can be identified and process flows may be modified to reduce the effect of inter-dependencies and resource bottlenecks on application performance.

DEFINITIONS

As used herein, unless specifically indicated otherwise, the word "or" is used in the inclusive sense of "and/or" and not the exclusive sense of "either/or."

Any issued U.S. patents, allowed applications, published foreign applications, and references that are cited herein are hereby incorporated by reference to the same extent as if each was specifically and individually indicated to be incorporated by reference.

In order for the present invention to be more readily understood, certain terms are first defined below. Additional definitions are set forth throughout the specification.

Component, System, Unit: the terms "system," "component" and "unit" are intended to refer to a computer-related entity, either hardware, a combination of hardware and software, software, or software in execution, examples of which are described herein. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

Application Service means a service provided for a client using a combination of hardware and/or software resources of the service provider.

Message Stream means a bitstream of messages exchanged between computer resource over a communication network using a communication protocol of the communication network.

Process means a sequence of one or more tasks, each task operating in response to an input to produce a result. Processes and tasks may be performed by hardware, software or a combination thereof.

Process Flow means a sequence of processes and associated sub-processes performed as part of the application service.

Process Identification Model means a type of statistical model configured trained to identify process flows and process flow components within a bitstream, the process identification model generating a process identification training table.

Process Map means a data structure that stores, for each process of a process flow of an application service, a plurality of attributes of the respective process, including but not limited to one or more of performance metrics for the process, critical paths of the process, dependencies of the process and resources of the process.

Process Model means a type of statistical model trained using the process identification training table to identify one or more process flows within a message stream and configured to detect anomalies in process flows of an input message stream in response to the process map.

DETAILED DESCRIPTION

According to one aspect, a process management server comprises a machine-learning model that may be trained to expose processes within a message stream in response to a training table. In one embodiment, one or more performance metrics of the exposed processes may be monitored to identify a process anomaly or other change in process performance, and to dynamically modify one or more process flows of an application service in response thereto. Such an arrangement improves system performance, efficiency and resource utilization. For example, system performance may be improved by re-ordering process order within a process flow of an application service to minimize resource overlap. Efficiency and resource utilization may be improved by re-ordering processes within a process flow, and/or subprocess order of a process, to maximize parallel processing and resource utilization while reducing application service delays.

These and other features of the invention will now be described with reference to the figures, wherein like reference numerals are used to refer to like elements throughout.

Figure 1:
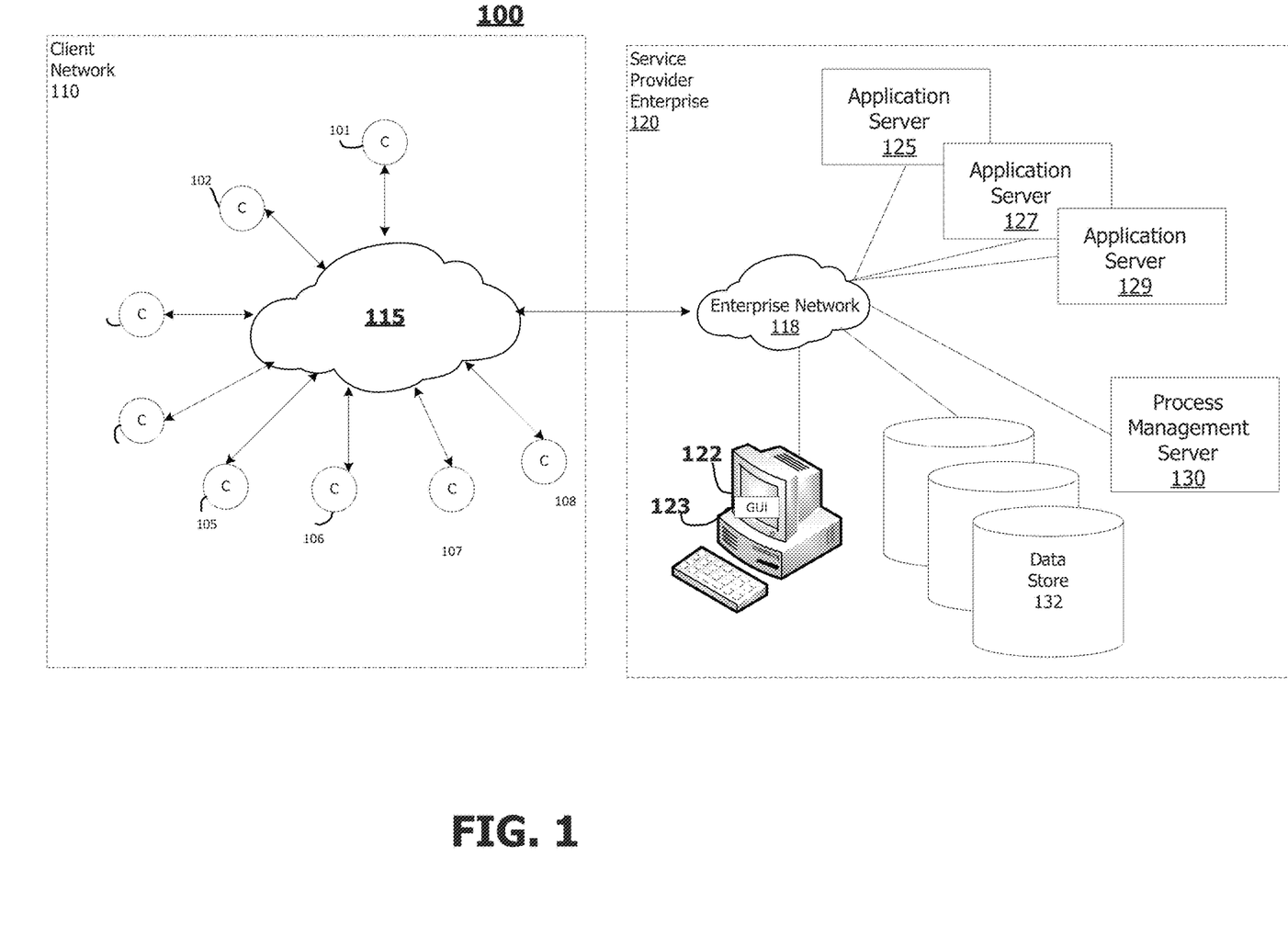
FIG. 1 is a block diagram of a system comprising one embodiment of a system including a process management server configured according to aspects of the invention.

Referring now to FIG. 1, FIG. 1 is a block diagram of a system 100 including a client network 110 comprised of a plurality of clients 101-108 coupled via a network 115 to a service provider enterprise 120.

Clients 101-108 may be any client device capable of communicating with applications provided by application servers 125, 127 and 129 of the service provider enterprise 120. Devices supporting such communications include, but are not limited to a computer device, or communications device including, e.g., a server, a network appliance, a personal computer (PC), a workstation, a mobile device, a phone, a handheld PC, a personal digital assistant (PDA), a thin client device, a fat client device, an Internet browser, or other device. Clients 101-108 also may be a mobile device; for example, a mobile device may include an iPhone, iPod, iPad from Apple® or any other mobile device running Apple's iOS operating system, any device running Microsoft's Windows® Mobile operating system, and/or any other smartphone or like wearable mobile device.

In some examples, network 115 may be one or more of a wireless network, a wired network or any combination of wireless network and wired network and may be configured to connect customers in client network 110 to service provider enterprise 120. For example, network 115 may include one or more of a fiber optics network, a passive optical network, a cable network, an Internet network, a satellite network, a wireless local area network ("LAN"), a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth, Near Field Communication (NFC), Radio Frequency Identification (RFID), Wi-Fi, and/or the like.

In addition, network 115 may include, without limitation, telephone lines, fiber optics, IEEE Ethernet 902.3, a wide area network ("WAN"), a wireless personal area network ("WPAN"), a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices.

Service provider enterprise 120 includes resources of a service provider, where a service provider is a company that provides one or more of products and services to customers. For example, each of application servers 125, 127 and 129 may be configured to support different application services provided by the service provider. The application servers 125, 127 and 129 may be supported using dedicated service provider resources, shared resources, licensed third-party resources, cloud resources or combinations thereof. The resources may include, but are not limited to, program code, processing capacity, storage resources, messaging services, etc.

According to one aspect, a service provider enterprise 120 includes a process management server 130 configured as disclosed herein to identify, monitor and modify process flows to improve the performance of services provided by an enterprise. In one embodiment, the process management server 130 is trained to identify process flows, dependencies, critical paths and performance metrics for an application service. For example, in one embodiment the process management server 130 may build a training table configured to detect process flows within enterprise message streams. The training table may be used in some embodiments to train a machine learning model that may be used to monitor enterprise messaging to detect performance anomalies. In one aspect, the process management server 130 comprises mechanisms for generating alternate process flows which may be selectively substituted for underperforming process flows to remediate application service anomalies. For the purposes of this application, 'remediate' shall mean to improve the performance of the process which manifested the anomaly.

In one embodiment, a workstation 122 may be communicatively coupled to the process management server 130, where the workstation may include a graphic user interface 123 comprising control mechanisms enabling a user at the workstation to communicate with the process management server 130 to build process training models and to monitor and modify process flows of application services.

The service provider may include an enterprise network 118 that secures communication between interconnected service provider resources. Like network 115, the enterprise network 118 may comprise wireless or wireline communication or combination technology and may use protocols such as those of network 115. Service provider enterprise 120 may further comprise a data store 132 that may be comprised of coupled data resources comprising any combination of local storage, distributed data center storage or cloud-based storage.

Figure 2:
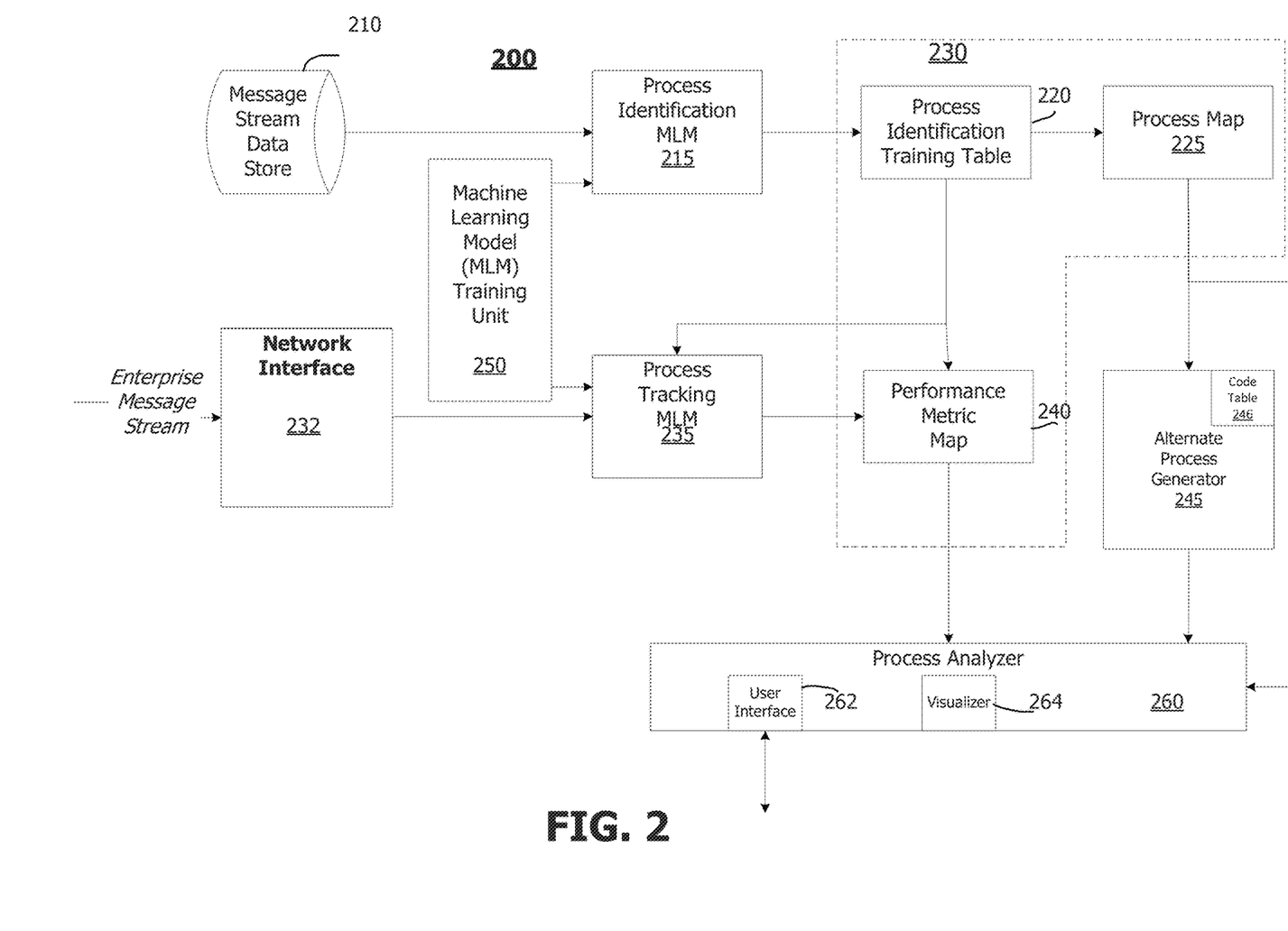
FIG. 2 is a block diagram illustrating exemplary components and communication flows between components in one embodiment of a process management service of FIG. 1.

FIG. 2 is a block diagram of exemplary components of a process management server 200. In one embodiment the process management server 200 is comprised of a combination of hardware and software resources of the enterprise which are configured to provide tools for: building one or more process models, analyzing message streams using the one or more process models to expose process flows, generating and visually representing statistical information related to the process flows, including visually representing process flow performance anomalies, suggesting alternate process flows, and selectively modifying an application in response to a selection of an alternate process flow.

In one embodiment, and as will be described in more detail below, the process management server is configured to support the above functionality with the support of machine learning models 215, 235.

Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. Such machine learning models may utilize probabalistic models including but not limited to Probabilistic Finite Automaton (PFA) based learning models using for example, Bayesian inference, Petri net synthesis and the like. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule.

Exemplary components of one embodiment of a process management server 200 are shown to include a message stream data store 210, a process identification MLM 215, a process tracking MLM 235 and a MLM training unit 250. The MLM training unit 250 is coupled to store one or more versions of a process identification training table 220 in memory 230.

According to one aspect, the message stream data store 210 is a data store having full text-based searching capabilities, may reside on a resource owned or licensed by the enterprise service provider and may be configured to store one or more message streams captured over enterprise network 118 from exchanges between a plurality of different resources within the service provider network. Each message stream is associated with data exchanged between endpoints over a communication medium using the protocol of the communication medium.

MLM training unit 250 controls the application of the message stream from message stream data store 210 to process identification MLM 215. The message stream may be applied to the MLM, using iterative probabilistic processing as described above to provide a training table for use in identifying processes. Over time, new message streams are applied to the process identifier MLM by the MLM training unit 250 until it is determined by the MLM training unit 250 that the training is complete. In some embodiments, training may be determined to be complete following a pre-determined number of training executions, (hundreds, thousands, etc.). Alternatively the training unit 250 may continuously update the training table using realtime events to further refine event pattern identification for processes in a real time environment. As a result, the MLM may be trained to identify events that may have been unobservable within a training data set.

As the message data stream is applied to the MLM 215, a process identification training table 220 is generated. As will be described in more detail below, in one embodiment the process identification training table 220 may be configured using machine-learning techniques such as iterative probabilistic modeling to identify processes, and associated process attributes such as at least process inputs, outputs, resources, dependencies, and critical paths. The process identification training table 220 may be trained using captured message stream data that is representative of real-time enterprise messaging, and iteratively applying it to the process identification MLM using iterative machine-learning techniques provided above to converge upon the process identification training table 220 solution.

Memory 230 may also store one or more process maps 225. In one embodiment the process map may comprise a data structure that stores, for each process of a process flow of an application service, a plurality of attributes of the respective process, including but not limited to one or more of performance metrics for the process, critical paths of the process, dependencies of the process and resources of the process. Process events, generated from a process activity or subprocess can be mined for process metric data like expected time for execution of subprocesses or external processes/other systems, wait times, temporal information, business data, correlated event data might contain additional information that used to directly define metrics for performance within the process flow. The process map 225 thus comprises information associated with an expected performance of the application service and may be used when monitoring application service performance to quickly detect and remedy performance anomalies.

According to one aspect, the process management server may also include an alternate process generator 245. In one embodiment as described in more detail below, the alternate process generator 245 may generate, for each process flow, process or subprocess, an alternate process flow, process or subprocess that may be substituted for the original process flow, process or subprocess when performance issues are encountered. In one embodiment, the alternate process generator may include a code table 246, that includes substitute program code that may be forwarded to the application server to modify problem process flows, processes or subprocesses upon detection of an anomaly. Additional details of the operation of the alternate code generator are provided with regard to FIG. 5.

Once the process identification training table 220 is configured, it may be used to train the process tracking MLM 235 by the MLM training unit 250. The trained process tracking MLM 235 may then be used to parse an enterprise message stream received over network interface 232 to detect process flows, processes and subprocesses, to collect performance metric information for the process flows, processes and subprocesses and to generate a performance metric map 240 which includes performance information for each of the processes. The performance information may include a process duration, a process resource utilization or other application service related information. The performance metric map 240 may be used in conjunction with the process map 225 to identify deviations from expected performance, highlighting process flow, process and subprocess issues for the application service.

The process management server 200 is also shown to include a visualizer 260 comprising a user interface 262 and an analysis unit 264. As will be described in more detail below, the visualizer enables a user to control various operations of the process management server, for example by building process models of different granularities, monitoring process performance and modifying application process flow. In one embodiment, the visualizer enables performance information to be viewed at a variety of different granularities to facilitate identification of resource constraints and bottlenecks at a subprocess level.

Figure 3:
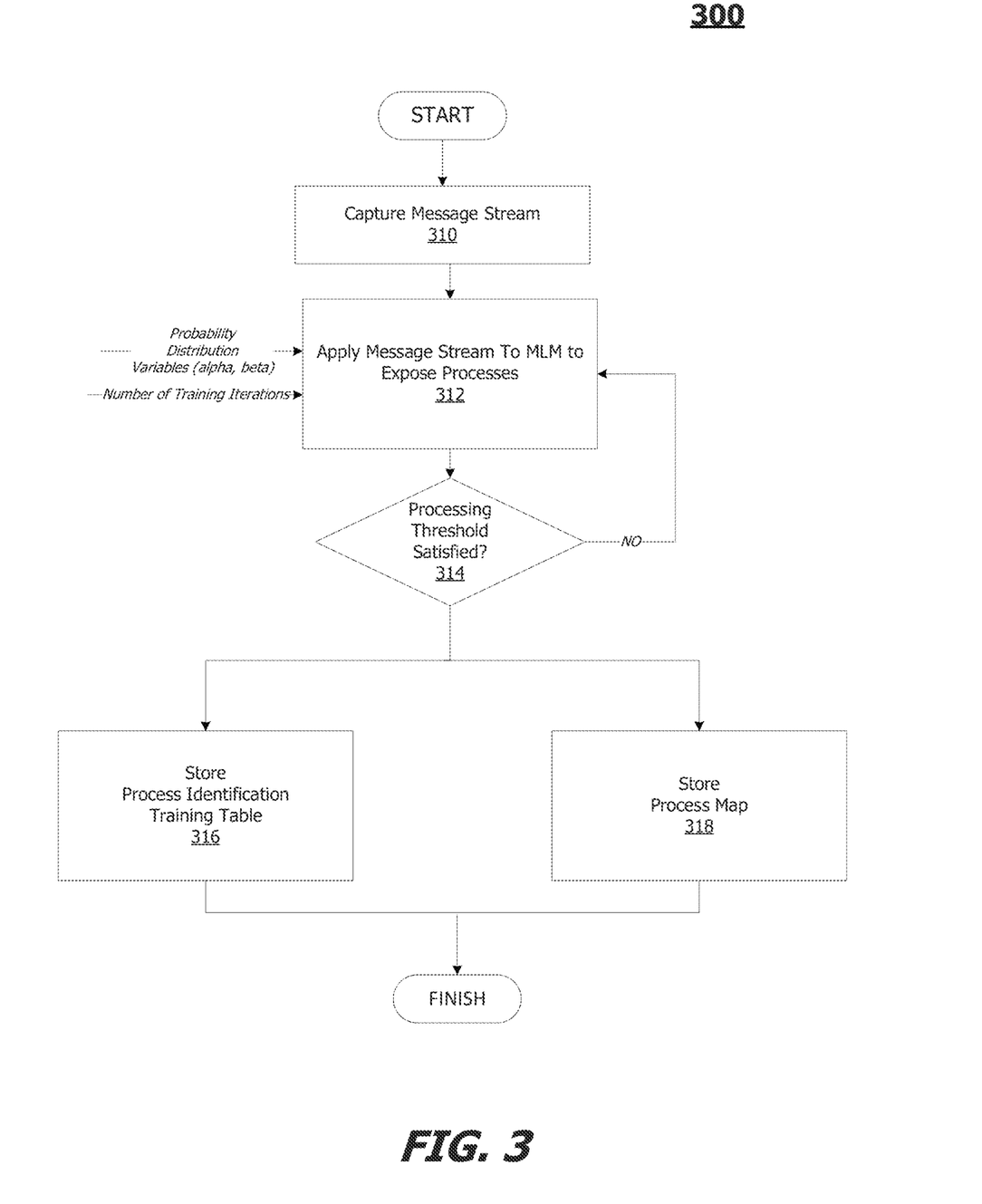
FIG. 3 is a data flow diagram illustrating exemplary steps that may be performed by a process management server of FIG. 2 to train a machine-learning model (MLM) for use by the process management server of FIG. 1.

FIG. 3 illustrates exemplary steps that may be performed in a process 300 for training a process identification MLM 215 for use by the process management server 200.

At step 310 a message stream is captured, for example by monitoring enterprise communications over network 118. The message stream advantageously includes enterprise messages received over time that are representative of those exchanged as part of an application service and thus can be used to identify process flows, processes, subprocesses, dependencies, critical paths and resource utilization for processes.

At step 312, the captured data stream is applied to the process identifier MLM to expose processes and build a training table to recognize exposed processes. In some embodiments, the training table includes process instances for each process at each hierarchical granularity in accordance with an application service processing hierarchy. That is, for an application service that includes three processes, one of the processes including four subprocesses, and one of the subprocess including its own subprocess, a process instance is generated for each process and each subprocess of the application service, with the process instance including information such as the program code, input and output variables, resources, etc. used by the process instance.

In one embodiment, the message stream is iteratively applied to the MLM until it is determined that a processing threshold is reached at step 314. The processing threshold may be, for example, a pre-identified number of iterations. Alternatively, processing may continue until a rate of identification of new processes within a message stream is below a threshold, or until the performance metrics for the process instance reach a steady state. For example, a measured duration of a process that is relatively consistent over a pre-determined period of time may provide an expected duration for the process. The amount of deviation that may be considered to be 'consistent,' and therefore determined to be a process identification training table solution is a matter of design choice and not a limitation of the invention.

Once the training threshold has been satisfied, at step 316 the process identification training table 220 may be stored in memory. As described above, in one embodiment the training table may include a plurality of hierarchically related process instances, each instance comprising attributes including a process function, a process input, and a process output. Although the term 'process instance' is used, it should be understood that 'a process instance' is used herein to refer to a data structure that may provide information for application service components of different granularities, for example, including, but not limited to, the process flows, processes and subprocesses of an application service.

In some embodiments, the process identification model may parse the message stream using text recognition services to identify process and subprocess calls, variable accesses, resource access and the like. The process identification MLM may be trained to recognize such calls as discrete events of the process flow, where in some embodiments an 'event' is the execution of one of a plurality of processes or subprocesses of a process flow. As part of the iterative analysis of message stream data, the process identification MLM 215 may determine performance metrics such as an expected time between events/processes/subprocesses, and dependencies between events. In some embodiments, such information may be stored as part of the training table. In other embodiments, such information may be stored as part of the information stored in the process map 225, which is stored in memory at step 318.

According to one aspect, the process map may include attributes related to each process, subprocess and correlated process data. The attributes may include information related to the inputs and outputs of the process, information related to one or more functions performed or resources used by the process, and information related to performance metrics of the process. An exemplary process map entry is shown in Table I below:

TABLE I

| Process Flow/Process/Subprocess Identifier | |
|---|---|
| Attribute Type | Source/Value |
| Variables | Inputs |
|  | Outputs |
| Resources | Program Code |
|  | Subprocesses |
|  | Libraries |
|  | Data Structures |
| Performance Metrics | Duration |
|  | Critical Path |

Although Table 1 illustrates a variety of different information that may be included in a process map, the present invention is not limited to the disclosed elements.

Figure 4A:
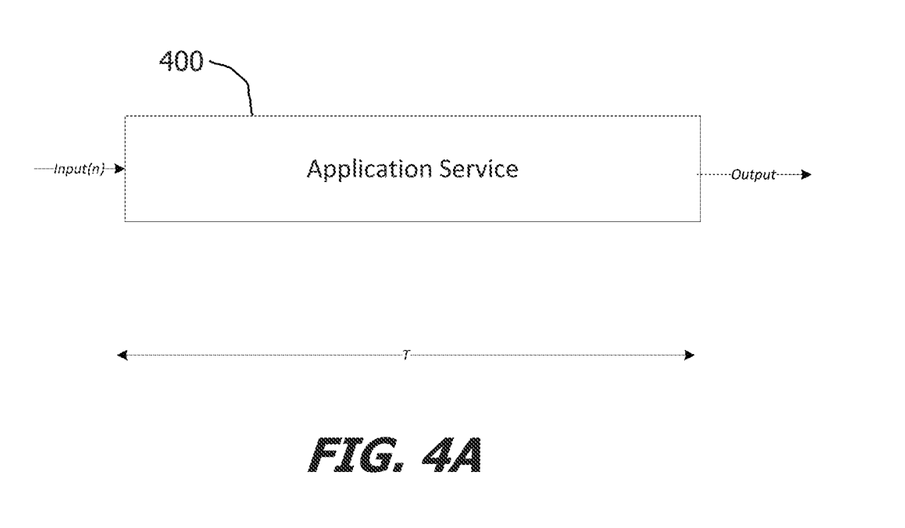
FIG. 4A and FIG. 4B illustrate the hierarchical relationship of application services processes.
Figure 4B:
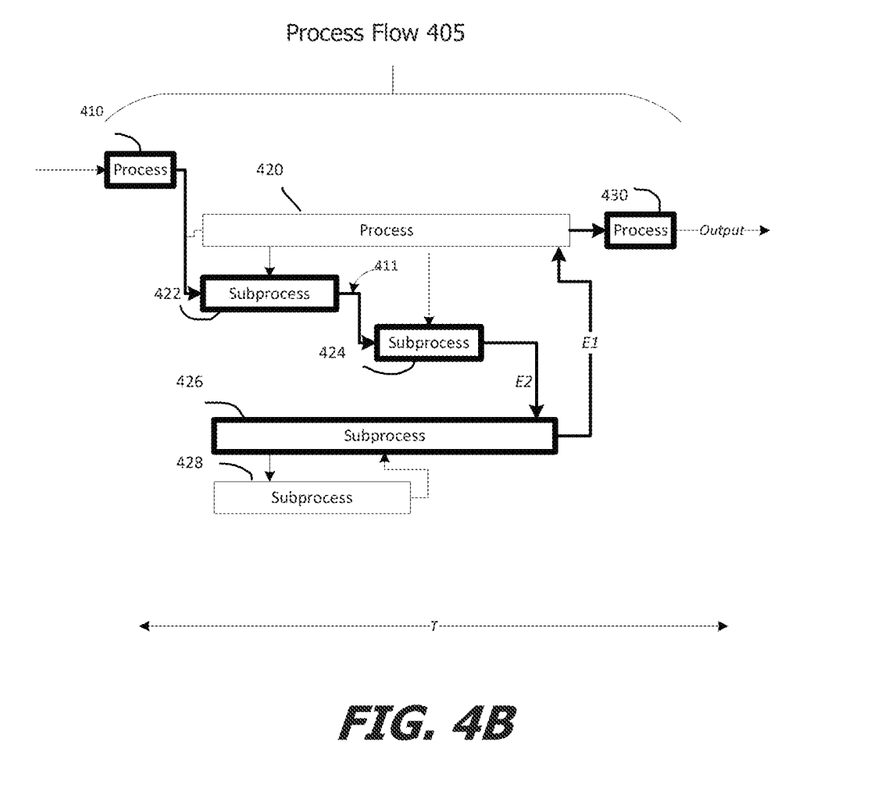

FIG. 4A and FIG. 4B are representative timing diagrams illustrating exemplary components of an application service 400, shown executing over time T, where dependencies are illustrated as events associated with the availability of inputs to a particular process flow 405. Process flow 405 is shown to include process 410, 420, 430. Process 420 is shown to include subprocesses 422, 424, 426 and 428. In one aspect, a duration of a process flow or subprocess is related to the time period between events such as receipt of an input and availability of an output of the process.

Events are represented as inputs received or generated at particular times. Dependencies may comprise event preconditions; i.e., process 420 is dependent upon the generation of event E1 from subprocess 426, which is dependent upon generation of event E2 by subprocess 424.

The duration of a process comprises the time between receipt of the first input to the process and transmission of the last output of the process. A critical path of the application service comprises the longest process/sub-process path between the start of the application service and the output. In FIG. 4B, critical path 411 is shown in bold to include process/subprocess 410, 420 422, 424, 426 and 430. In one embodiment, when altering a process order within a process flow, modifications that do not increase the duration of the critical path of an application service are prioritized.

Figure 5:
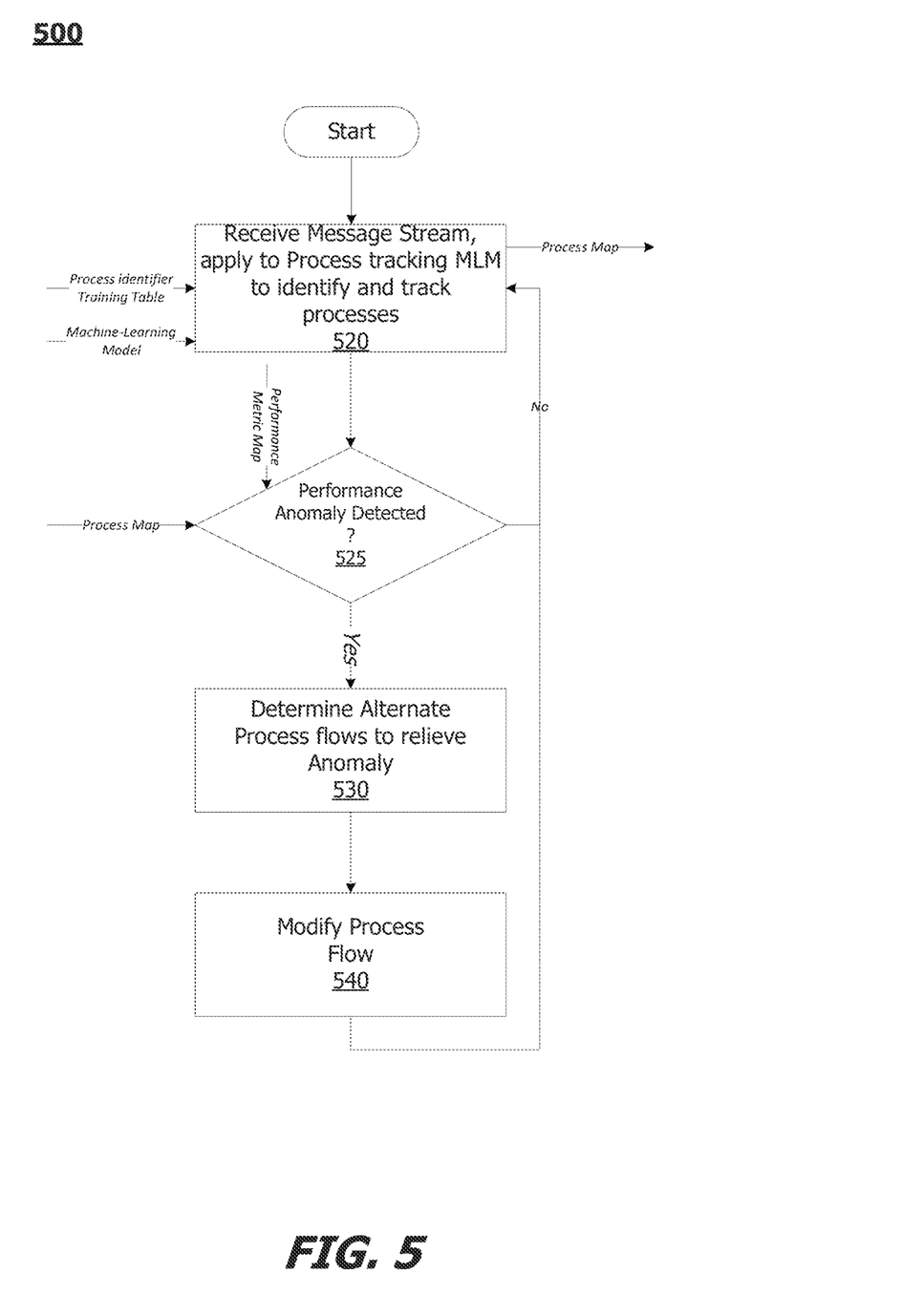
FIG. 5 is a flow diagram of illustrating exemplary steps that may be performed by a process management server of FIG. 2 to track process performance by in a performance management server of FIG. 2.

FIG. 5 is a flow diagram 500 of exemplary steps that may be performed by the process management server 200 to monitor network traffic to detect and repair processing anomalies. At step 520 a received message stream is applied to the process tracking MLM 235. In one embodiment, the process tracking MLM 235 has been trained using a process identification training table generated using a process similar to process 300 of FIG. 3. In one embodiment, application of the message stream to the process tracking MLM results in the collection of performance metrics for the application service components. The performance metrics for the application service components may be stored at a variety of granularities within a performance metric map. For example, performance metrics may be provided at a process flow, process, and subprocess granularity, or at coarser or finer granularities.

At step 525 the performance metric map 240 may be compared to the process map 225 to determine whether processes are performing as expected. In one embodiment, a visualizer may provide a display comprising information related differences between performance metrics provided by the MLM and expected performance metrics, to highlight potential performance improvement opportunities for an application service.

At step 530, if an anomaly is detected, in one embodiment an alternate process flow, process or subprocess may be generated and at step 540 substituted for the process flow, process or subprocess experiencing the anomaly. For example, in one embodiment, resources may be reallocated to subprocesses to remove bottleneck.

In one embodiment, generation of alternate program code is performed dynamically in response to attributes of the process instance having the anomaly, where as described above the attributes include the inputs and resources used by the process instance. For selection of alternate process/subprocess recommendation (including a modified process flow/re-order/removal/addition of automated system that can improve the process), a user may be provided with appropriate subprocess/activity information and metrics/attributes to assist in appropriate selection of alternate program code for the business purpose. In one embodiment, the generation of an alternate program code may include any combination of one or more of removing an overloaded resource from use by a process, re-ordering processes to streamline processing, introducing automated systems adapter, auto-scaling of system that performs a certain subprocess, reducing wait times by introducing alternated paths or sub-processes, changing a synchronous system to a asynchronous one, or other modifications to the process.

In some embodiments, alternate program code may be dynamically generated and deployed within an application service without user intervention. In other embodiments, a user may control program code modification, for example, form selecting among an available set of modifications, or alternatively may reject a modification.

Figure 6:
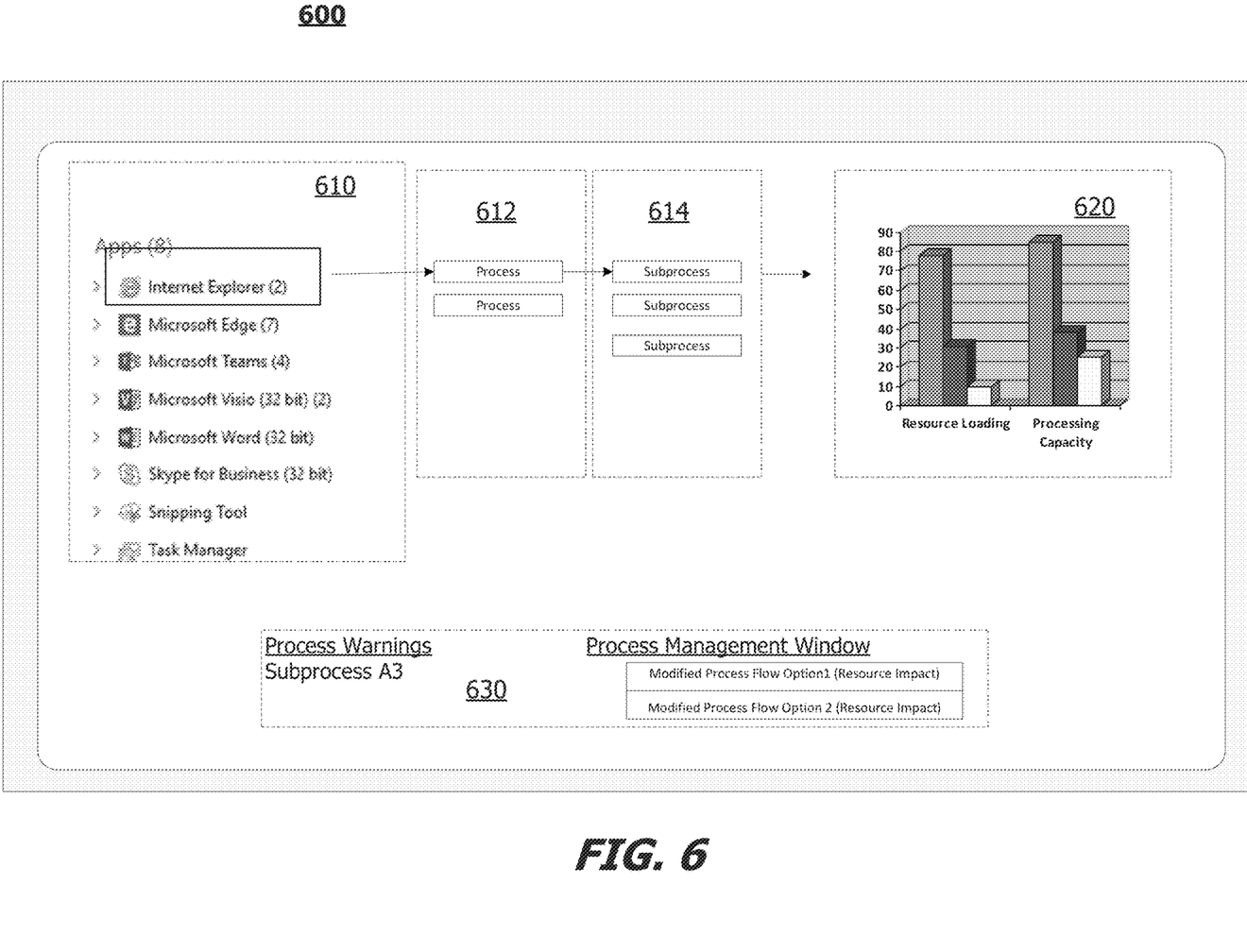
FIG. 6 is an exemplary embodiment of control and visualization mechanisms that may be provided for managing a process management server as disclosed herein.

For example, FIG. 6 illustrates an exemplary landing page 600 of a graphic user interface (GUI) that may be provided by the process management server in some embodiments to build and deploy a process identification model. The landing page may include a window 610 including a list of executing application services and may include a window 620 that visually represents the loading of processes of one of the application services listed in window 610. According to one aspect, a user may select an application service to generate a process display window 612 including a list of processes of the application service and may select a process from process window 612 to display a subprocess window 614. Accordingly, the GUI enables a user to visualize application performance from a variety of different processing granularities to assist in an understanding of an underlying cause of a performance anomaly.

As described above, according to one aspect, a process Management Window 630 may display to a user one or more alternate process instances for substitution of poorly performing process. It can be appreciated that the threshold of acceptability for performance degradation is largely a matter of design choice and may vary depending based on different parameters including a type of application service, a type of client accessing the application service, whether the process is external or internal, performed by a system or human resource, is synchronous or asynchronous within the flow, resources are shared amongst several sub-processes, etc.

In some embodiments, functions of the process management server may be automated. For example, in some embodiments message streams may be proactively and periodically pulled from the network, processed by the process tracking MLM and monitored to generate performance metrics that may be stored for later review by a user on a visualizer. In some embodiments, the process may run in the background, and generate a notification and/or warning emails upon the detection and/or remediation of performance issues.

The disclosed process management server may be used by any enterprise that monitors and tracks the quality of provided services, including but not limited to network service providers, application service providers, storage service providers, payment service provider and online service providers. For example, a telecommunications service provider may use aspects described herein to coordinate delivery of customer content in accordance with customer contract terms. A loan vendor may use the aspects disclosed herein to track the performance of various lending processes including loan origination, funding, and servicing. A web-content service provider may use aspects disclosed herein to control the delivery of web content to clients.

Accordingly, a system and method for process management provide a mechanism for building process identification models, analyzing message streams using the process identification models to track process performance, generating and visually representing information for the processes, including enabling hierarchical review of process components and selectively or automatically modifying program code to remediate processing anomalies.

Some embodiments may be described using the expression "one embodiment" or "an embodiment" along with their derivatives. These terms mean that a feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be used together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," howαever, may also mean that two or more elements are not in direct contact with each other, but still cooperate or interact with each other.

Various embodiments also relate to apparatus or systems for performing these operations. This apparatus may be specially constructed for the required purpose, or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A process management server comprising:
   a processor;
   a storage device;
   a process map, stored in the storage device, the process map storing a plurality of processes identified by a predictive model, and for each of the plurality of processes, a plurality of process attributes including a process dependency, a process resource, a process critical path and an expected process performance;
   program code, stored in the storage device, the program code operable when executed upon by the processor to:
   monitor an incoming message stream;
   dynamically update the process map based on the incoming message stream;
   identify one or more processes in the incoming message stream;
   monitor a real-time performance metric of each of the one or more processes;
   compare the real-time performance of each of the one or more processes to the expected process performance of a corresponding process in the process map to identify at least one process having diminished performance; and
   modify the at least one process having diminished performance by modifying program code of at least one process to change, for the at least one process, the process dependency, the process resource, the process critical path or a combination thereof.

2. The process management server of claim 1 wherein the program code to cause the processor to identify one or more processes in the incoming message stream by:
   training the predictive model to identify processes by detecting process flows, identifying subprocesses associated with the process flows, identify processing hierarchies, detecting process dependencies, or a combination thereof.

3. The process management server of claim 1 wherein the process resource includes program code, libraries, data structures, subprocesses or a combination thereof.

4. The process management server of claim 1 wherein the process map further identifies, for each process, one or more inputs to each process.

5. The process management server of claim 1 wherein the process map further identifies, for each process, one or more outputs of each process.

6. The process management server of claim 1 wherein the expected process performance for a process relates to a duration of the process, a resource utilization of the process, or a combination thereof.

7. The process management server of claim 1 wherein at least some of the plurality of processes are hierarchically related and wherein the program code is operable to modify the at least one process having diminished performance to preserve a hierarchical relationship between the plurality of processes.

8. The process management server of claim 1 wherein the storage device further comprises a plurality of alternate program code alternatives, and wherein the program code is operable to modify the at least one process having diminished performance by replacing the at least one process with one of the alternate program code alternatives.

9. The process management server of claim 8 wherein the program code is operable to modify the at least one process by automatically or manually selecting an alternate program code alternative.

10. The process management server of claim 8 wherein selecting one of the alternate program code alternatives is performed using the predictive model.

11. A method for managing processes in a service provider enterprise includes:
    monitoring an incoming message stream;
    identifying one or more processes in the incoming message stream using a predictive model;
    monitoring a real-time performance metric of each of the one or more processes;
    comparing the real-time performance of each of the one or more processes to an expected performance of a corresponding process in a process map to identify at least one process having diminished performance, the process map comprising the one or more processes identified by the predictive model, and for each of the one or more processes, a plurality of process attributes including a process dependency, a process resource, a process critical path and an expected process performance, and wherein the process map is dynamically updated based on the incoming message stream; and
    modifying the at least one process having diminished performance by modifying program code of at least one process to change, for the at least one process, the process dependency, the process resource, the process critical path or a combination thereof.

12. The method of claim 11 wherein the step of identifying one or more processes associated with the incoming message stream includes the steps of:
    training the predictive model to identify processes by detecting process flows, identifying subprocesses associated with process flows, identify processing hierarchies, detecting process dependencies, or a combination thereof.

13. The method of claim 11 wherein the process resource for the at least one process includes program code, libraries, data structures, subprocesses or a combination thereof.

14. The method of claim 11 wherein the process map further identifies for each process one or more inputs of each process.

15. The method of claim 11 wherein the process map further identifies for each process one or more outputs of each process.

16. The method of claim 11 wherein the expected performance of a process relates to a duration of the process, a resource utilization of the process, or a combination thereof.

17. The method of claim 11 wherein at least some of one or more processes are hierarchically related and wherein the step of modifying the at least one process having diminished performance preserves a hierarchical relationship between the processes.

18. The method of claim 11 including identifying a plurality of alternate program code alternatives, and wherein the step of modifying the at least one process having diminished performance includes automatically or manually replacing the at least one process with one of the alternate program code alternatives.

19. The method of claim 18 wherein the step of selecting one of the alternate program code alternatives is performed using the predictive model.

20. A method for managing processes in a service provider enterprise includes:
monitoring an incoming message stream;
identifying one or more processes in the incoming message stream using a trained predictive model;
monitoring a real-time performance metric of each of the one or more processes;
comparing the real-time performance of each of the one or more processes to an expected performance of a corresponding process in a process map to identify at least one process having diminished performance, the process map comprising the one or more processes identified by the predictive model, and for each of the one or more processes, a plurality of process attributes including a process dependency, a process resource, a process critical path and an expected process performance, and wherein the process map is dynamically updated based on the incoming message stream; and
modifying the at least one process having diminished performance by replacing the at least one process with alternate program code selected from a plurality of alternative program code options determined to remediate performance issues for similar processes.

* * * * *